United States Patent

Otsuka et al.

[11] Patent Number: 5,549,954
[45] Date of Patent: Aug. 27, 1996

[54] MAGNETIC DISC

[75] Inventors: Haruhiko Otsuka; Yuzo Murayama; Akihiko Tashiro; Kyoko Hyomi; Naohiko Ishimaru, all of Yokohama, Japan

[73] Assignee: AG Technology Co., Ltd., Yokohama, Japan

[21] Appl. No.: 296,910

[22] Filed: Aug. 31, 1994

[30] Foreign Application Priority Data

Sep. 20, 1993 [JP] Japan .................. 5-233248

[51] Int. Cl.⁶ .................. B32B 3/02; G11B 5/66; G11B 5/70
[52] U.S. Cl. .................. 428/65.3; 428/65.4; 428/65.5; 428/141; 428/694 T; 428/694 TR; 428/694 TS; 428/694 TP; 428/694 ST; 428/694 SG
[58] Field of Search .................. 428/694 T, 694 SG, 428/694 ST, 694 TR, 141, 64, 65, 66, 694 TP, 694 TS, 65.3, 65.4, 65.5; 156/646, 663; 65/31; 360/135

[56] References Cited

U.S. PATENT DOCUMENTS

| | | | |
|---|---|---|---|
| 4,619,869 | 10/1986 | Kiriyama et al. | 428/480 |
| 4,833,001 | 5/1989 | Kijima et al. | 428/141 |
| 4,910,068 | 3/1990 | Takagi et al. | 428/141 |
| 4,997,696 | 3/1991 | Kamada et al. | 428/141 |
| 5,119,258 | 6/1992 | Tsai et al. | 360/135 |
| 5,202,810 | 4/1993 | Nakamura et al. | 360/135 |

FOREIGN PATENT DOCUMENTS 5189756  7/1993  Japan.

*Primary Examiner*—Paul J. Thibodeau
*Assistant Examiner*—Stephen Sand
*Attorney, Agent, or Firm*—Oblon, Spivak, McClelland, Maier & Neustadt, P.C.

[57] ABSTRACT

A magnetic disc having one or multiple undercoat layers, a continuous thin film magnetic layer or continuous thin film multiple magnetic layers, a protective layer and a lubricant layer sequentially laminated on a non-magnetic disc substrate, which has surface roughness on the surface of the magnetic disc, said surface roughness being such that when the surface roughness is measured by an atomic force microscope or a scanning tunnel microscope, the maximum peak height is from 150 Å to 800 Å based on the height giving the highest frequency in the height distribution of the surface roughness, and the depth ($D_{0.5}$) at a bearing ratio of 0.5% from the highest point is from 80 Å to 450 Å.

9 Claims, 4 Drawing Sheets

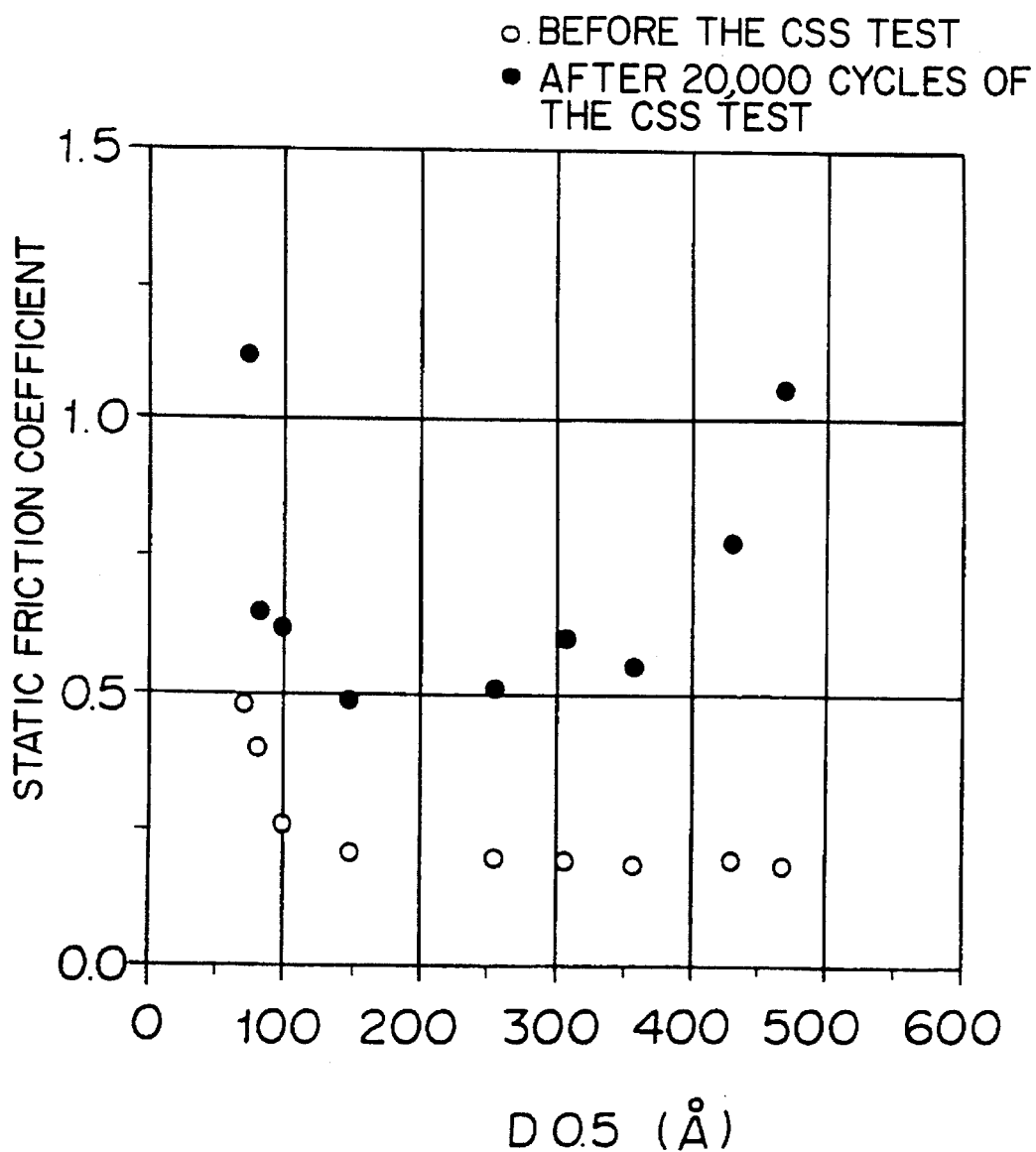

MAGNETIC DISC

BACKGROUND OF THE INVENTION

1. Field of the Invention

The present invention relates to a magnetic disc and a magnetic disc substrate.

2. Discussion of Background

A magnetic recording medium (hereafter referred to simply as a medium) having one or multiple undercoat layers, a continuous thin film magnetic layer or continuous thin film multiple magnetic layers, a protective layer and a lubricant layer sequentially laminated on a non-magnetic substrate of a disc shape, and a magnetic head for recording and reproduction (hereafter referred to simply as a head) constitutes the main components of a hard disc drive apparatus. At the initiation of the operation, the head and the medium are in contact with each other. During rotation of the medium, the head is lifted from the surface of the medium by the resistance of air. At the termination of the operation, the head will again be in contact with the medium. This system is called a contact-start-stop (CSS) system. If the surface of the medium is smooth, the head is likely to stick to the medium (this phenomenon is called "head stick"), which is likely to cause head crash or hinder the initiation of the hard disc drive apparatus.

It is known to prevent such head stick by preliminarily forming roughness on the surface of the medium by various methods such as a mechanical method, an etching method (such as the one disclosed in Japanese Unexamined Patent Publication No. 37718/1989) or a deposit method, to reduce the friction coefficient between the head and the medium.

On the other hand, to increase the recording density of a hard disc drive apparatus, it is necessary to reduce the guaranteed minimum flying height (so-called glide height) of the magnetic head. To reduce the glide height, it is known to control the maximum roughness (Rmax) or the average roughness (Ra) of the surface roughness of the magnetic disc within a certain range. However, with such conventional techniques, it has been difficult to fully satisfy the above-mentioned two requirements. Namely, the medium which satisfies the CSS durability without causing head stick, tends to hardly satisfy the glide height requirement. On the other hand, the one which satisfies the glide height requirement tends to hardly satisfy the CSS durability.

SUMMARY OF THE INVENTION

The present invention has been made to accomplish a difficult object to satisfy both the glide height requirement and the CSS durability, and it is an object of the present invention to provide a magnetic disc which satisfies both properties at the same time.

The present invention has been made to accomplish the above object and provides a magnetic disc having one or multiple undercoat layers, a continuous thin film magnetic layer or continuous thin film multiple magnetic layers, a protective layer and a lubricant layer sequentially laminated on a non-magnetic disc substrate, which has surface roughness on the surface of the magnetic disc, said surface roughness being such that when the surface roughness is measured by an atomic force microscope or a scanning tunnel microscope, the maximum peak height is from 150 Å to 800 Å based on the height giving the highest frequency in the height distribution of the surface roughness, and the depth ($D_{0.5}$) at a bearing ratio of 0.5% from the highest point is from 80 Å to 450 Å. The above depth ($D_{0.5}$) is particularly preferable in the range from 80 Å to 360 Å.

Further, the present invention provides a magnetic disc having one or multiple undercoat layers, a continuous thin film magnetic layer or continuous thin film multiple magnetic layers, a protective layer and a lubricant layer sequentially laminated on a non-magnetic disc substrate, which has a surface roughness on the surface of the non-magnetic disc substrate, said surface roughness being such that when the surface roughness is measured by an atomic force microscope or a scanning tunnel microscope, the maximum peak height is from 150 Å to 800 Å based on the height giving the highest frequency in the height distribution of the surface roughness, and the depth ($D_{0.5}$) at a bearing ratio of 0.5% from the highest point is from 80 Å to 450 Å. The above depth ($D_{0.5}$) is particularly preferably from 80 Å to 360 Å.

Furthermore, the present invention provides a non-magnetic disc substrate to be used for a magnetic disc having one or multiple undercoat layers, a continuous thin film magnetic layer or continuous thin film multiple magnetic layers, a protective layer and a lubricant layer sequentially laminated on the non-magnetic disc substrate, which has surface roughness on its surface, said surface roughness being such that when the surface roughness is measured by an atomic force microscope or a scanning tunnel microscope, the maximum peak height is from 150 Å to 800 Å based on the height giving the highest frequency in the height distribution of the surface roughness, and the depth ($D_{0.5}$) at a bearing ratio of 0.5% from the highest point is from 80 Å to 450 Å. The above depth ($D_{0.5}$) is particularly preferable in the range from 80 Å to 360 Å.

BRIEF DESCRIPTION OF THE DRAWINGS

FIG. 5 is a graph showing the relation between the $D_{0.5}$ of the surface roughness of the magnetic disc and the static friction coefficient of the magnetic disc surface before CSS test and after 20,000 times of the CSS test.

DETAILED DESCRIPTION OF THE PREFERRED EMBODIMENTS

Figure 1:
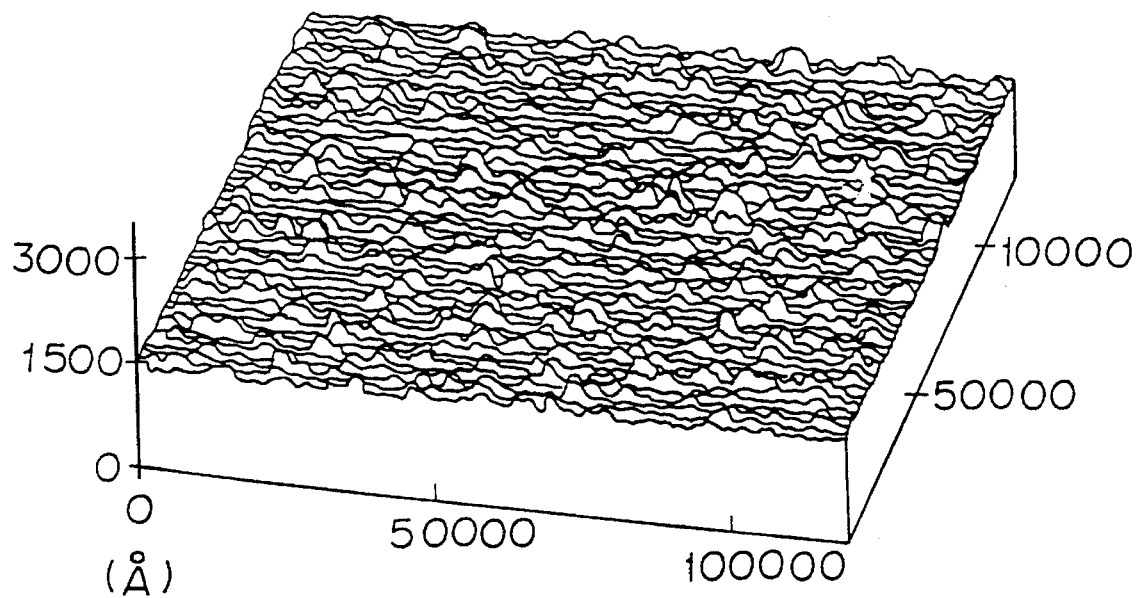
FIG. 1 shows a profile of the surface roughness of a magnetic disc of Example 1 as measured by an atomic force microscope.

Here, when the surface roughness of a magnetic disc is measured by an atomic force micrometer (hereafter referred to simply as AFM) or a scanning tunnel microscope (hereafter referred to simply as STM), the field of view is preferably from 5 μm×5 μm to 50 μm×50 μm. FIG. 1 shows an example for the measurement by AFM of the surface configuration of a typical magnetic disc of the present invention. STM is useful only for the measurement of an electrically conductive surface, and it is necessary to employ AFM when a disc having a non-conductive surface is to be measured.

Figure 2:
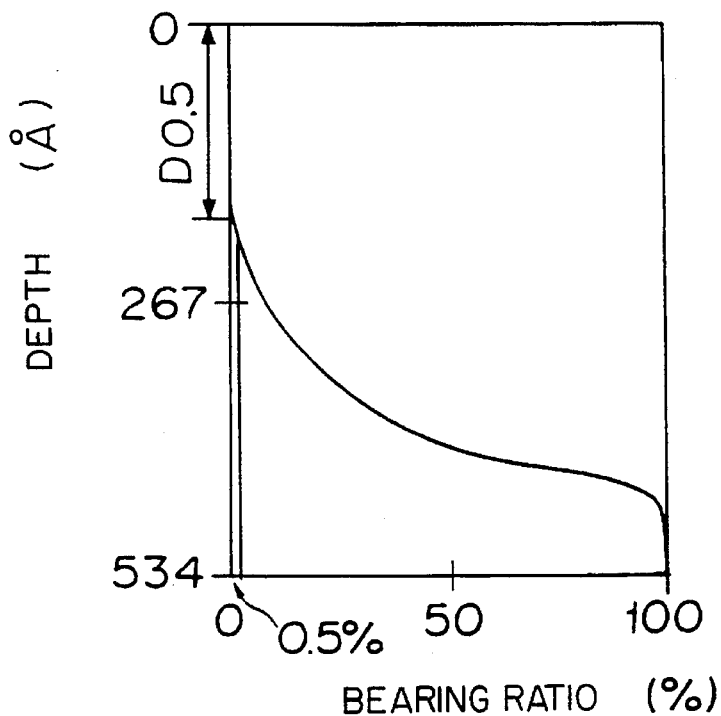
FIG. 2 shows a bearing ratio curve of the surface roughness of the magnetic disc of Example 1.

In FIG. 1, the surface configuration is three-dimensionally shown, and the ratio (percentage) of the area which appears when this configuration is cut along a contour plane, to the entire area measured, is called a bearing ratio. A curve obtained by plotting such a bearing ratio along the abscissa and the depth i.e. the vertical distance of the contour plane at the bearing ratio from the highest point along the ordinate, is called a bearing ratio curve. FIG. 2 shows a bearing ratio curve of the configuration of FIG. 1.

Figure 3:
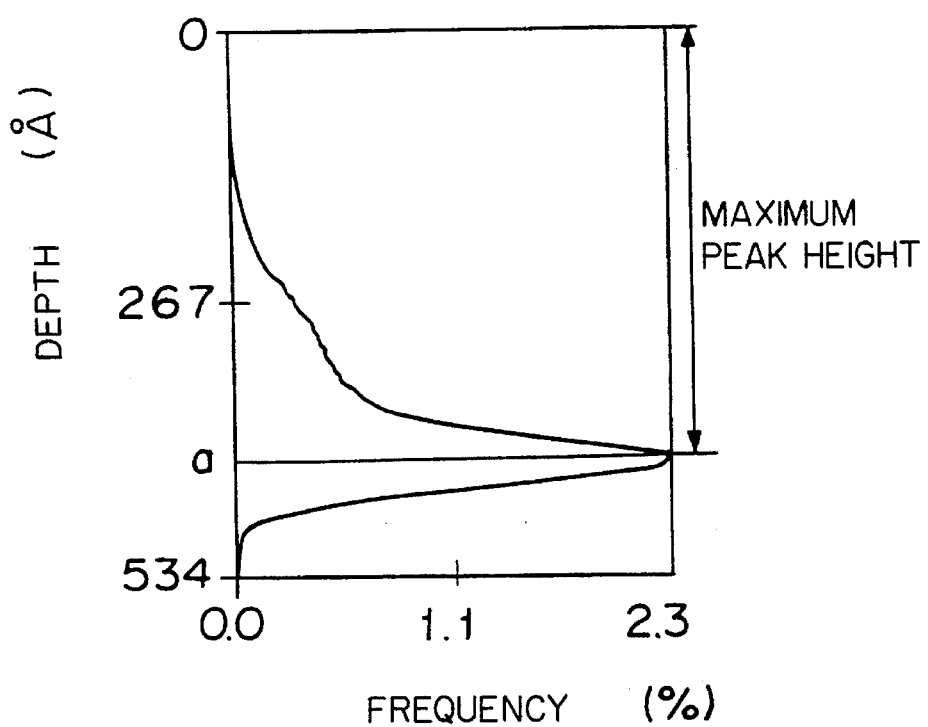
FIG. 3 is the height distribution curve of the surface roughness of a magnetic disc of Example 1.

What is obtained by differentiating the bearing ratio curve with the above-mentioned depth, corresponds to the height distribution curve of the surface roughness. FIG. 3 shows the differentiated curve of FIG. 2 i.e. the height distribution curve of the surface roughness of FIG. 1. In FIG. 3 i.e. in the height distribution curve of the surface roughness of FIG. 1, the height (or the depth) giving the highest frequency (point a in FIG. 3) represents the base level of the surface roughness of FIG. 1, and the vertical distance from this base level to the highest point of the surface roughness is herein called "the maximum peak height". Further, the depth (the vertical distance) of the level where the bearing ratio is 0.5%, from the highest point, is called $D_{0.5}$, which will be an index showing the sharpness of the peak. Namely, the larger the value of $D_{0.5}$, the sharper the forward end of the peak, and the smaller the value, the smoother the forward end.

Figure 4:
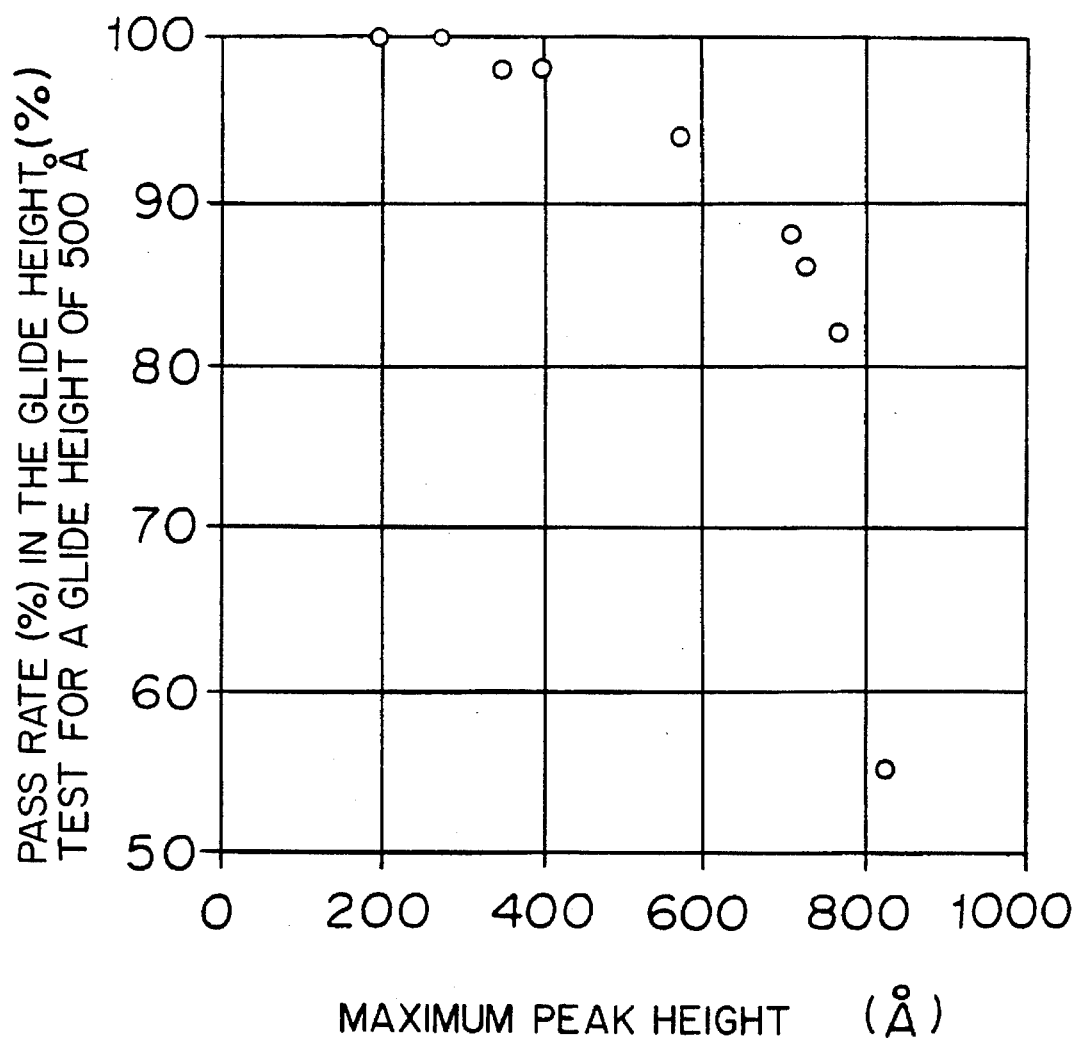
FIG. 4 is a graph showing the relation between the maximum peak height of the surface roughness of the magnetic disc and the pass rate in a glide height test.

As a result of various studies, the present inventors have found that there is an intimate relationship, as shown in FIG. 4, between the maximum peak height when the surface roughness of the magnetic disc is measured by AFM or STM, and the pass rate of the test which guarantees the minimum flying height (hereinafter referred to as the glide height test) of a magnetic head at 500 Å, and that if the maximum peak height exceeds 800 Å, it will be difficult to maintain the yield which is practically feasible for industrial production.

Further, there is an intimate relationship, as shown in FIG. 5, between the above-mentioned $D_{0.5}$ when the surface roughness of a magnetic disc is measured by AFM or STM, and the static friction coefficient of the magnetic disc surface before and after the CSS test, and if $D_{0.5}$ is less than 80 Å or exceeds 450 Å, the static friction coefficient after the CSS test of 20,000 cycles, will be so high that it is difficult to practically utilize such a disc. Further, with a magnetic disc wherein the maximum peak height is less than 150 Å when the surface roughness of the magnetic disc is measured by AFM or STM, there will be no problem with respect to the pass rate in the above-mentioned glide height test, but it will be practically difficult to form the surface roughness so that the above-mentioned $D_{0.5}$ will be at least 80 Å.

Accordingly, it is possible to obtain a magnetic disc which satisfies both the above-mentioned glide height requirement and the CSS durability by specifying the surface configuration of a magnetic disc having roughness on its surface, so that when the surface roughness is measured by an atomic force microscope or a scanning tunnel microscope, the maximum peak height is from 150 Å to 800 Å based on the height giving the highest frequency in the height distribution of the surface roughness, and the depth ($D_{0.5}$) at a bearing ratio of 0.5% from the highest point is from 80 Å to 450 Å, preferably at most 360 Å.

This surface roughness is required to maintain such a configuration only at the outermost surface of the magnetic disc, and roughness to provide such surface roughness may be formed either on the non-magnetic substrate, in the undercoat layer, on the undercoat layer, in the magnetic layer, on the magnetic layer, in the protective layer or on the protective layer. However, it is preferred that such roughness is formed on the non-magnetic substrate, since the surface configuration can thereby be maintained for a long period of time. Further, the non-magnetic substrate is preferably made of glass, since glass is excellent in the hardness, the impact resistance and the surface flatness.

Now, the present invention will be described in further detail with reference to Examples. However, it should be understood that the present invention is by no means restricted by such specific Examples.

EXAMPLES

A magnetic disc having the above-mentioned surface configuration can be prepared, for example, by a method disclosed in Japanese Unexamined Patent Publication No. 37718/1989. Namely, a gas mixture having 0.01 mol % to 2 mol % of hydrogen fluoride incorporated to an inert gas or air having the moisture adjusted to a relative humidity of from 1% to 30%, contacts to disc-shaped glass substrates maintained at a temperature within a range of from 10° C. to 50° C., to form surface roughness of various configurations to such disc-shaped glass substrates.

By the above described method, by employing various conditions, the surface roughness of various configurations as identified in Table 1 were formed on the surfaces of disc-shaped glass substrates each having an outer diameter of 95 mm, an inner diameter of 25 mm and thickness of 1.27 mm. The configurations shown in Table 1 are represented by the values measured in a field of vision of 12 μm×12 μm by an atomic microscope "the Nano Scope II", manufactured by Digital Instruments, Inc., U.S.A.

On each disc-shaped glass substrate having roughness thus formed, an undercoat layer, a magnetic layer and a carbon protective layer were sequentially formed by sputtering, and a lubricant composed of perfluoropolyester was coated thereon in a thickness (i.e., the thickness of the lubricant) of from 30 Å to 50 Å to obtain a magnetic disc. The surface roughness of such a magnetic disc was measured by the above-mentioned atomic force microscope, whereby it (i.e., the roughness of the disc) showed substantially the same values as the roughness formed on the surface of the above disc-shaped glass substrate.

These magnetic discs were subjected to a glide height test for a gliding height of 500 Å, whereby the pass rates of the test are also shown in Table 1 and FIG. 4. Namely, in Examples 1 to 6 wherein the maximum peak height as defined in claim 1 is within a range of from 150 Å to 800 Å, the pass rates are from 82 to 100%, which represents yields feasible for practical industrial production. Whereas, in Comparative Example 1 wherein the maximum peak height is 820 Å, the pass rate is as low as 55%. Further, these magnetic discs were subjected to a CSS test up to 20,000 cycles by means of a thin film magnetic head having a nano slider at a flying height of 625 Å and a load of 3.0 g, whereby the static friction coefficient of each magnetic disc with the head before the test and after 20,000 cycles of the CSS test are also shown in Table 1 and FIG. 5.

Namely, in Examples 1 to 6 wherein the above-mentioned $D_{0.5}$ values are within a range of from 80 Å to 450 Å, the static friction coefficients before the test are within a range of from 0.19 to 0.40, and the static friction coefficients after the test are within a range of from 0.49 to 0.77, thus showing practically adequate durability. Whereas, in Comparative Example 2 wherein $D_{0.5}$ is 71 Å, the static friction coefficient before the test is 0.48, which is slightly high as compared with those of Examples 1 to 6, and the static friction coefficient after the test is as high as 1.12, whereby head stick is likely to occur, and difficulties are practically likely. Further, in Comparative Example 3 wherein $D_{0.5}$ is 470 Å, the static friction coefficient after the test is as high as 1.06, whereby difficulties are practically likely as in the case of Comparative Example 2, although the static friction coefficient before the test is not problematic at a level of 0.20.

TABLE 1

|  | Maximum peak height as defined in Claim 1 | $D_{0.5}$ | Static friction coefficient before the CSS test | Static friction coefficient after 20,000 cycles of the CSS test | Pass rate in the glide height test for a glide height of 500 Å |
|---|---|---|---|---|---|
| Example 1 | 397 Å | 149 Å | 0.21 | 0.49 | 98% |
| Example 2 | 197 Å | 83 Å | 0.40 | 0.65 | 100% |
| Example 3 | 275 Å | 100 Å | 0.26 | 0.62 | 100% |
| Example 4 | 570 Å | 255 Å | 0.20 | 0.51 | 94% |
| Example 5 | 709 Å | 358 Å | 0.19 | 0.55 | 88% |
| Example 6 | 766 Å | 430 Å | 0.20 | 0.77 | 82% |
| Comparative Example 1 | 820 Å | 306 Å | 0.20 | 0.60 | 55% |
| Comparative Example 2 | 352 Å | 71 Å | 0.48 | 1.12 | 98% |
| Comparative Example 3 | 725 Å | 470 Å | 0.19 | 1.06 | 86% |

As described in the foregoing, the glide height property can be secured by defining the maximum peak height of the surface roughness of a magnetic disc as measured by AFM or STM within a certain range, and the CSS durability can be controlled to a level-where there will be no practical problem, by defining $D_{0.5}$ of the surface roughness within a certain range.

According to the present invention, in a magnetic disc having one or multiple undercoat layers, a continuous thin film magnetic layer or continuous thin film multiple magnetic layers, a protective layer and a lubricant layer sequentially laminated on a non-magnetic disc substrate, which has a roughness on its surface, the surface configuration of the magnetic disc is defined so that when the surface roughness is measured by an atomic force microscope or a scanning tunnel microscope, the maximum peak height is from 150 Å to 800 Å based on the height giving the highest frequency in the height distribution of the surface roughness, and the depth ($D_{0.5}$) at a bearing ratio of 0.5% from the highest point is from 80 Å to 450 Å, preferably at most 360 Å, whereby gliding of the magnetic head can be stabilized even at an extremely low glide height at a level of 500 Å and it is possible to obtain a magnetic disc which is durable against CSS of at least 20,000 cycles.

What is claimed is:

1. A magnetic disc having one or multiple undercoat layers, a continuous thin film magnetic layer or continuous thin film multiple magnetic layers, a protective layer and a lubricant layer sequentially laminated on a non-magnetic disc substrate, the surface roughness on the outermost surface of the lubricant layer being such that when the surface roughness is measured by an atomic force microscope or a scanning tunnel microscope, the maximum peak height is from 150 Å to 800 Å, with the maximum peak height measured from the height giving the highest frequency in the height distribution of the surface roughness, and the depth ($D_{0.5}$) at a bearing ratio of 0.5% from the highest point is from 80 Å to 450 Å.

2. The magnetic disc according to claim 1, wherein the non-magnetic disc substrate is made of glass.

3. A magnetic disc having:
a plurality of layers including one or more multiple undercoat layers, a continuous thin film magnetic layer or continuous thin film multiple magnetic layers, a protective layer and a lubricant layer sequentially laminated on a non-magnetic disc substrate;
said magnetic disc having a surface roughness on the surface of the non-magnetic disc substrate upon which said plurality of layers are disposed, said surface roughness of the non-magnetic disc substrate being such that when the surface roughness is measured by an atomic force microscope or a scanning tunnel microscope, the maximum peak height is from 150 Å to 800 Å, with the maximum peak height measured from the height giving the highest frequency in the height distribution of the surface roughness, and the depth ($D_{0.5}$) at a bearing ratio of 0.5% from the highest point is from 80 Å to 450 Å.

4. The magnetic disc according to claim 3, wherein the non-magnetic disc substrate is made of glass.

5. A non-magnetic disc substrate to be used for a magnetic disc having a plurality of layers including one or multiple undercoat layers, a continuous thin film magnetic layer or continuous thin film multiple magnetic layers, a protective layer and a lubricant layer sequentially laminated on the non-magnetic disc substrate, said non-magnetic disc substrate having a surface roughness on the surface of the non-magnetic disc substrate upon which said plurality of layers are to be disposed, said surface roughness of said non-magnetic disc substrate being such that when the surface roughness is measured by an atomic force microscope or a scanning tunnel microscope, the maximum peak height is from 150 Å to 800 Å, with the maximum peak height measured from the height giving the highest frequency in the height distribution of the surface roughness, and the depth ($D_{0.5}$) at a bearing ratio of 0.5% from the highest point is from 80 Å to 450 Å.

6. The non-magnetic disc substrate according to claim 5, wherein the non-magnetic disc substrate is made of glass.

7. The magnetic disc of claim 1, wherein the depth ($D_{0.5}$) at a bearing ratio of 0.5% from the highest point is not greater than 360 Å.

8. The magnetic disc of claim 3, wherein the depth ($D_{0.5}$) at a bearing ratio of 0.5% from the highest point is from 80 Å to 360 Å.

9. The magnetic disc of claim 5, wherein the depth ($D_{0.5}$) at a bearing ratio of 0.5% from the highest point is from 80 Å to 360 Å.

* * * * *